Figure 7:
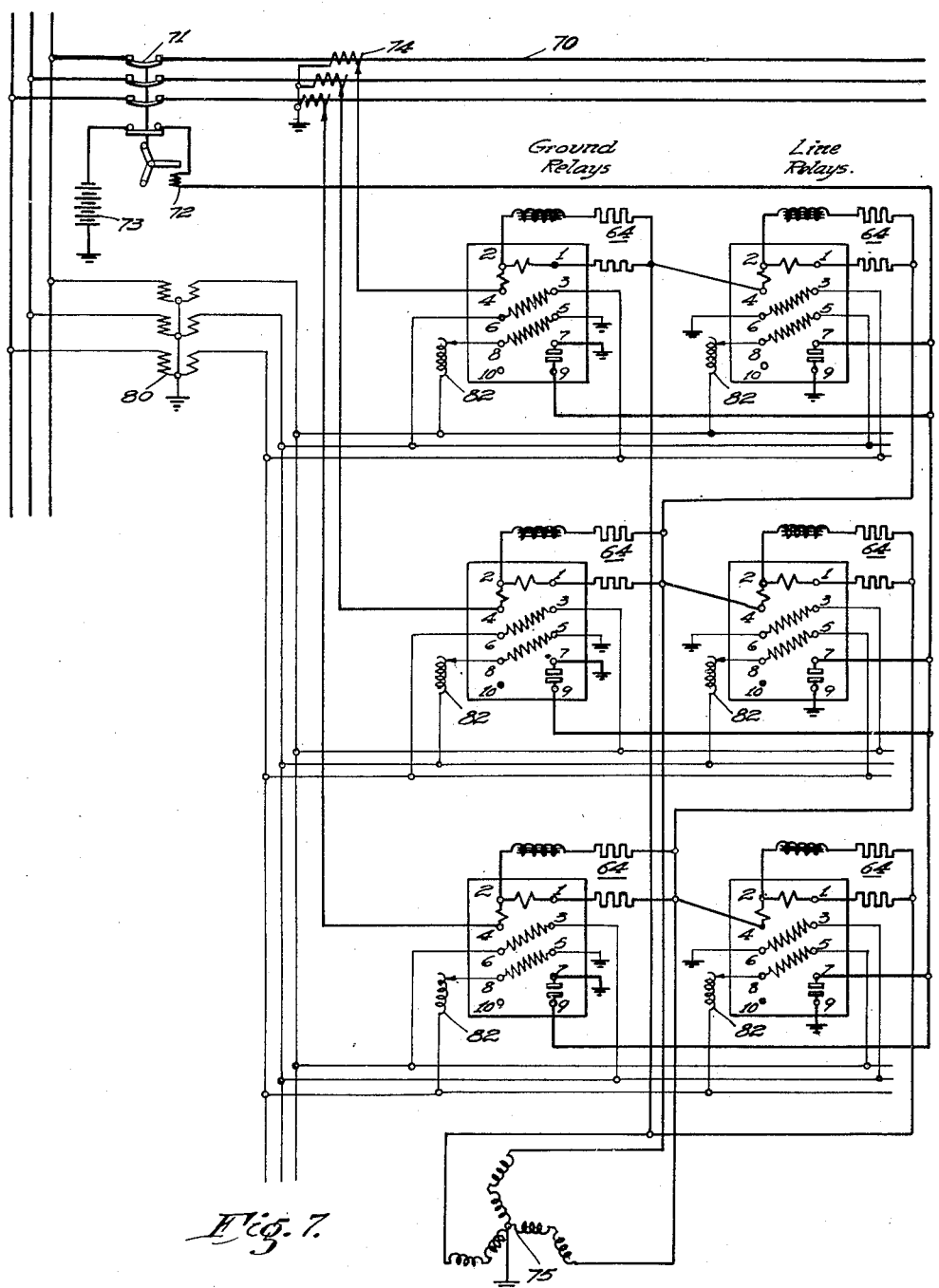

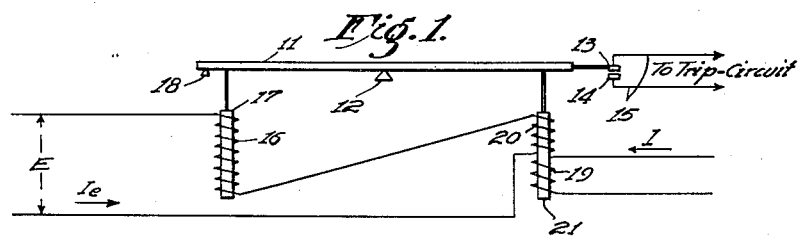
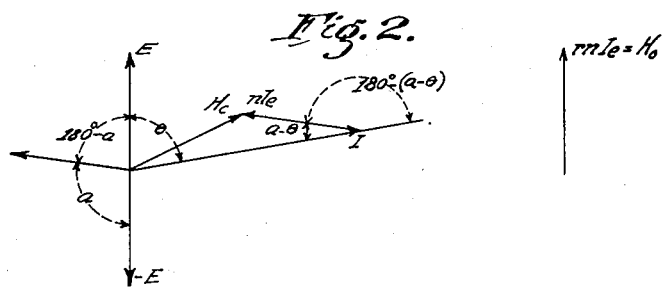
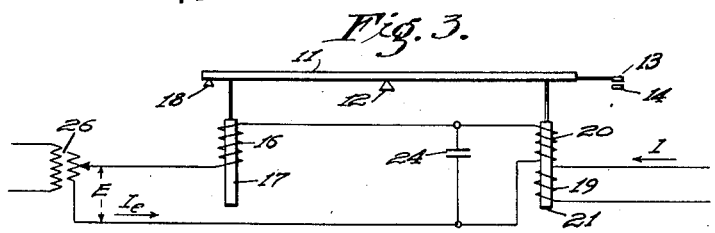
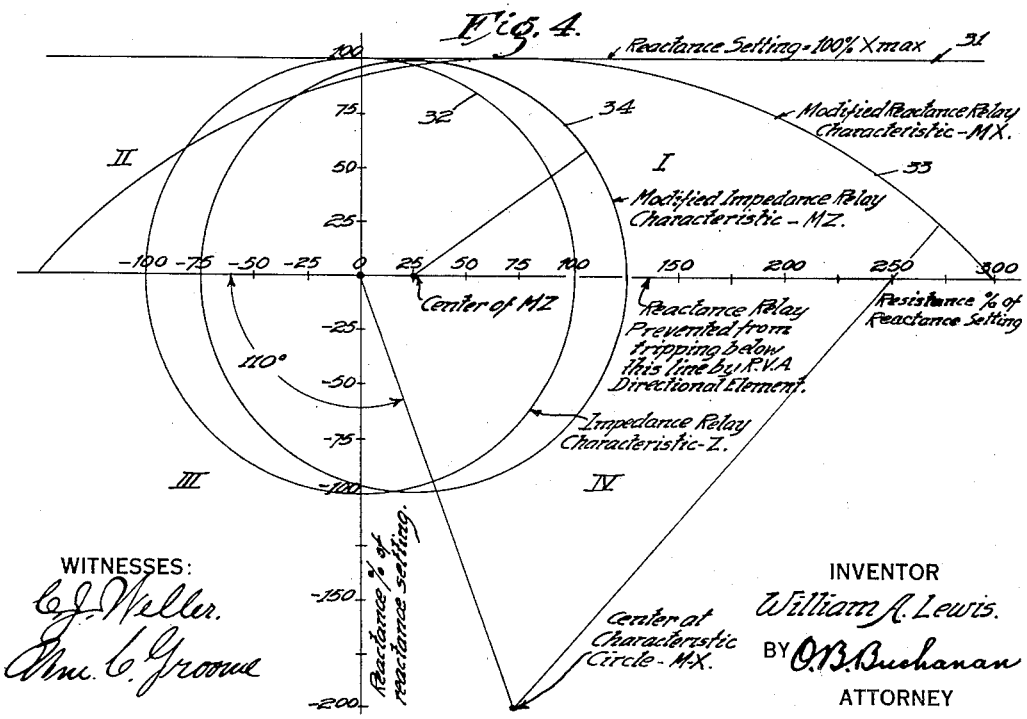

July 17, 1934.  W. A. LEWIS  1,967,093
MODIFIED IMPEDANCE REACTANCE RELAY
Filed Jan. 25, 1932  4 Sheets-Sheet 2
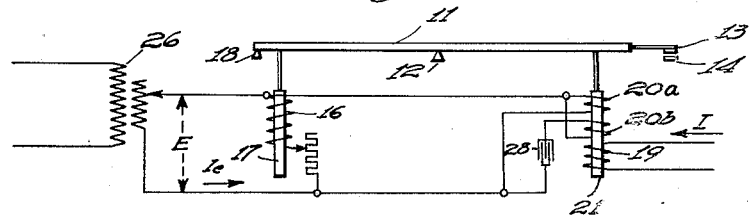
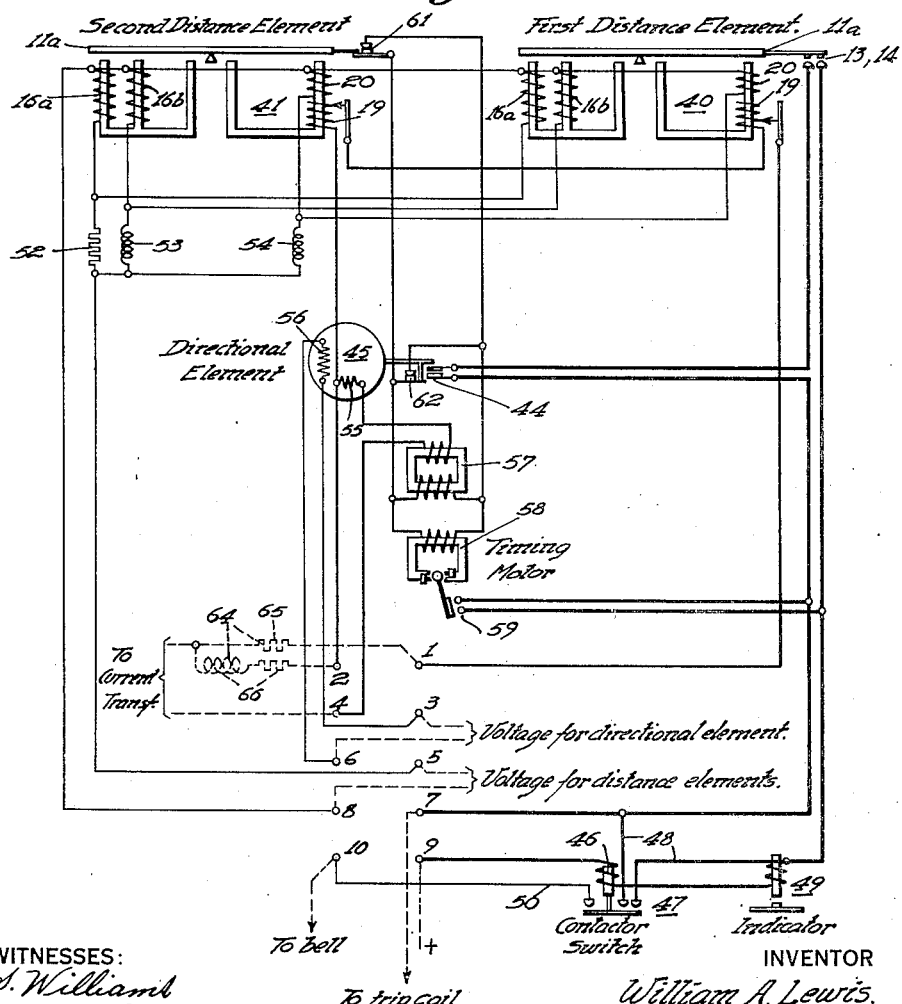
WITNESSES:
INVENTOR
William A. Lewis.
BY
ATTORNEY July 17, 1934.  W. A. LEWIS  1,967,093
MODIFIED IMPEDANCE REACTANCE RELAY
Filed Jan. 25, 1932  4 Sheets-Sheet 4
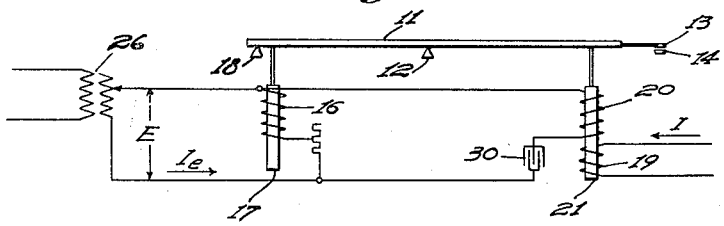
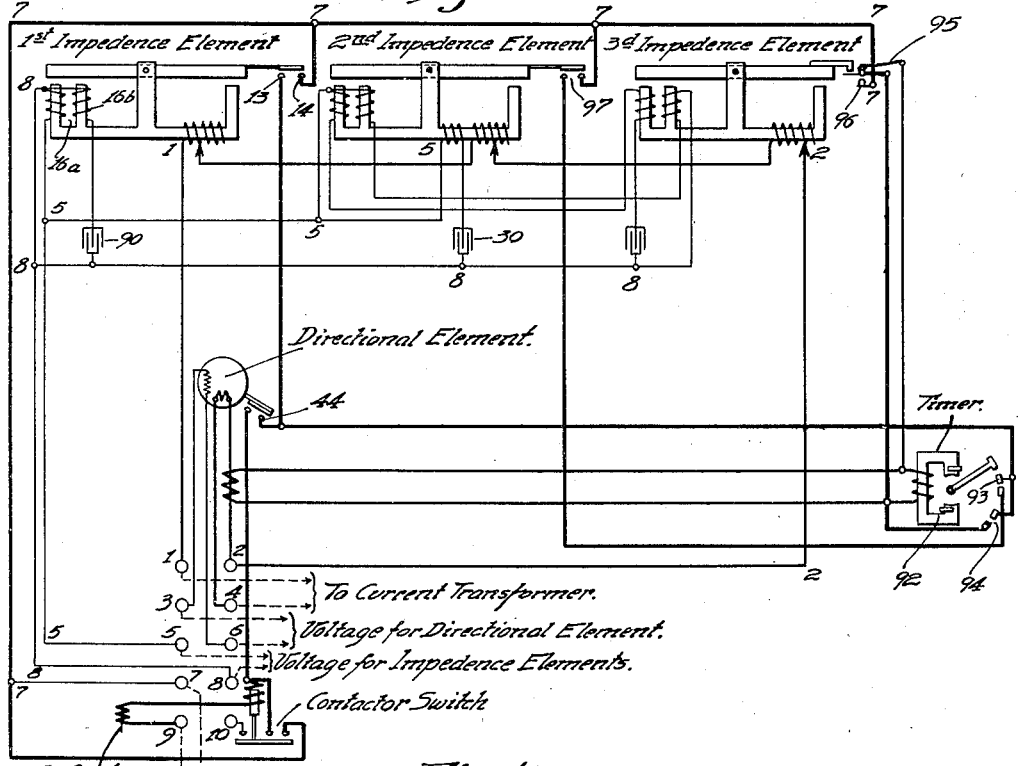
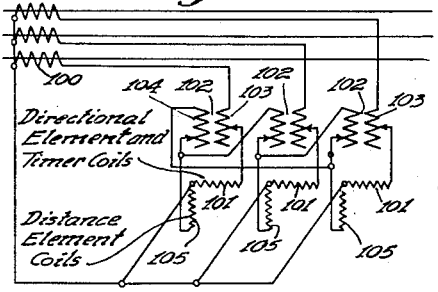
WITNESSES:
INVENTOR
William A. Lewis.
BY O. B. Buchanan
ATTORNEY Patented July 17, 1934

1,967,093

UNITED STATES PATENT OFFICE 1,967,093

MODIFIED IMPEDANCE-REACTANCE RELAY

William A. Lewis, Wilkinsburg, Pa., assignor to Westinghouse Electric & Manufacturing Company, a corporation of Pennsylvania Application January 25, 1932, Serial No. 588,782

16 Claims. (Cl. 175—294)

My invention relates to a new design of modified impedance or reactance relay which has certain advantages in the discovery of faults on single-phase and polyphase lines. More particularly, my invention has relation to certain modifications which are designed for use in high-speed relaying on three-phase grounded transmission lines. My improved relay is suitable for either single or parallel line operation, and represents what I believe to be an improvement on the high-speed impedance relay, which is the subject of an application of S. L. Goldsborough, Serial No. 448,937, filed May 1, 1930, and assigned to the Westinghouse Electric and Manufacturing Company.

Before the advent of high-speed relaying and fault-clearing systems such as are described in a patent of R. D. Evans and others, No. 1,899,613, patented February 28, 1933, and assigned to the Westinghouse Electric and Manufacturing Company, induction-type impedance relays were extensively used for the isolation of transmission lines on which either line-to-line faults or ground faults have occurred. Such relays operated slowly, in a time dependent upon the distance of the fault, so that time-discriminations were relied upon to distinguish between near and distant faults. These induction-type relays were usually not seriously affected by resistance in the fault itself, since the effect of such resistance was to slightly increase the time required for the relay to operate, while still permitting it to operate, eventually.

With the advent of high-speed clearing of faults, it has become necessary to use a principle of operation, known as "distance relaying", in which the apparent impedance measured by the relay determines whether or not the relay shall trip at all, instead of determining merely the time required for the relay to trip. Thus, if resistance appears in a fault on a line protected by high-speed or "instantaneous" impedance relays, it may increase the apparent impedance to a point where the relay will not trip at all. This is particularly true in ground faults, in which case the fault-resistance may reach such a high value that it produces a very large change in the apparent impedance measured by the relay.

To overcome this difficulty, it would be desirable to have a suitable relay which would trip when a fault occurs, if the apparent reactance measured at the relay is less than a certain value. Such a reactance relay would be independent of any accidental resistance in the fault, but it would suffer from the very grave, fundamental disadvantage that it would trip under ordinary load conditions, when there is no fault, but when the power factor approaches unity. In such cases, the apparent line-reactance, under non-fault conditions, approaches zero, and is thus smaller than any value which it could have for even the faults closest to the relaying point.

The object of my present invention, therefore, is to provide a relay device which will not trip under load conditions, but which, on the occurrence of a fault, will be substantially unaffected by the fault-resistance. To this end, I utilize a combination reactance and impedance relay, or a relay operating on a modified characteristic, as will be subsequently described.

A more specific object of my invention is to provide a modified instantaneous or high-speed impedance relay in which a suitably energized voltage coil or coils is or are added to the current element of the relay, to modify its characteristics as will be subsequently described.

By the term "impedance" relay or "reactance" relay, I mean also to include a "susceptance" relay, in which the contacts are simply reversed, being normally closed, instead of normally open. I contemplate the application of such "susceptance" relays, with modified characteristics as herein described, to indicate a sound line before reconnecting a tripped-out line to its power-source.

A still further object of my invention is to provide an instantaneous balance-beam impedance relay element with a voltage-responsive restraining coil constructed in two dephased parts for the purpose of preventing chattering and preventing tipping of the beam during the period when the voltage is going through zero.

A still further object of my invention is to provide an improved connection for the various current-coils of a complete relay, whereby some coils are traversed by line current and others are traversed by the difference between two line currents, either with or without provision for changing the relative strengths of the two kinds of currents, thereby providing a ready means of adjustment of the balance point of my modified impedance-reactance relay.

My invention is particularly adapted to short transmission lines, of the order of two miles length, more or less, dependent upon the line-characteristics. In such short lines, the arc-resistance may be large as compared to the line reactance, so that an instantaneous impedance relay would be unreliable. In lines of average length, or longer, the maximum arc resistance is, in general, considerably less than the line reactance at the "balance point" of the relay, so that no departure from the "impedance" principle is needed.

My invention, when it is used, on short lines, is also applicable principally to the first timed element of the relaying systems. Laboratory and field tests on arc characteristics have shown that initially the arc resistance is very low, and remains so for several cycles. If the arc is not interrupted immediately, it may stretch out and thus increase the arc-resistance to several times its initial value, but this requires time,—something of the order of half a second. These considerations indicate that, in the first relaying zone, or up to about 80% of the length of the line-section, where the circuit-breakers are tripped instantaneously, or within about one cycle, or less, on a 60-cycle line, the error in distance measurement, due to the effect of arc-resistance, will not seriously affect the operation of an ordinary high-speed impedance relay, and my special relay is not, in general, needed. In the second relaying zone, however, where a definite time relay is purposely introduced, the arc-resistance may increase to a sufficient value to affect the operation of an impedance relay, and this is where my invention is more particularly needed. In the third relaying zone, the distances are greater and the relay-settings are by no means critical, so that ordinary impedance relays may be utilized.

With the foregoing objects and applications in view, my invention resides in the novel structures, combinations, systems and methods hereinafter described and claimed, and illustrated in the accompanying drawings, wherein Figure 1 is a diagrammatic view illustrating the general principle of my improved modified-characteristic relay-element, Fig. 2 is a vector diagram which will be referred to in the explanation of my modified impedance or reactance relay, Fig. 3 is a view similar to Fig. 1, illustrating a different embodiment of my relay-element, Fig. 4 is a curve-diagram showing relay characteristics, Fig. 5 is a view similar to Fig. 1, illustrating another embodiment, Fig. 6 is a diagrammatic view of my entire relay, in one form of embodiment, Fig. 7 is a diagrammatic view of a fault-clearing system utilizing six of my relays for protecting a three-phase line against both line-to-line faults and ground faults, Fig. 8 is a view similar to Fig. 1, showing schematically what is now my preferred form of embodiment of the improved distance-relay element, Fig. 9 is a view similar to Fig. 6 showing what is now my preferred form of embodiment of the entire relay, and Fig. 10 is a diagrammatic view illustrating an improved connection of the various current-coils of a complete relay.

The relay shown diagrammatically in Fig. 1 comprises a balance beam 11, centrally pivoted at 12, and carrying, at its right-hand end, a movable contact-member 13 which is adapted to be drawn down against a stationary contact-member 14 of a trip circuit 15. On the left-hand end of the balance beam 11 is a solenoid 16, operating on a plunger 17 and tending to draw down the beam against a back-stop 18, so as to open the contacts 13 and 14. On the right-hand end of the beam 11 are two solenoids 19 and 20 which are so arranged and interleaved that they both operate on a single plunger 21, tending to close the contacts 13 and 14. The coil 19 is energized in accordance with the line-current I, and the coils 16 and 20 are energized to be responsive to the line-voltage E, said voltage-coils being shown connected in series, although the series connection is not essential to the action of the relay.

It will be noted that the main or left-hand voltage-coil 16 tends to open the contacts 13, 14, in opposition to the current-coil 19, and it may be referred to as the opposing voltage-coil. The other voltage-coil, 20, however, is on the same end of the beam 11 as the current-coil 19, and it may be referred to as the auxiliary voltage-coil.

The two voltage-coils 16 and 20 are connected to the secondary winding of a voltage-transformer (not shown in Fig. 1) either directly or through an external impedance or a phase-changing network. The current-coil 19 is energized from a current-transformer (not shown in Fig. 1), which may be utilized in parallel with a transient shunt (not shown in Fig. 1), as set forth hereinafter, in connection with Figs. 6 and 7, and as claimed in a patent of L. N. Crichton, No. 1,924,307, granted August 29, 1933, and assigned to the Westinghouse Electric and Manufacturing Company.

The action of the relay may be more easily understood if the fundamental equations describing its operation are worked out. The discussion immediately following gives the analysis for the simplest case, in which no transient shunt is used, and in which the mutual coupling between the two closing-coils 19 and 20 is considered negligible on account of the smallness of the induced, mutual-reactance voltage and current in comparison with the total voltage and current, respectively. It will be readily understood that a more rigorous mathematical calculation, taking all effects into consideration, may be made, in any given installation of the relay.

As shown in Fig. 2, I shall assume that the line-current I lags $\theta$ degrees behind the line-voltage E, and that the voltage-coil current $I_e$ lags $a$ degrees behind the voltage ($-E$). Considering that the number of turns of the current-coil 19 is unity, I shall assume that the relative number of turns of the voltage coils 20 and 16, respectively, as compared to the current-coil, are $n$ and $rn$.

The closing force or pull $P_c$, operating on the right-hand plunger 21 of the relay, is proportional to the square of the magnetizing force or field-strength $H_c$ which is one side of a triangle (Fig. 2), the other sides of which are I and $nI_e$; the angle between these two sides I and $nI_e$ being $(a-\theta)$. The value of the resultant magnetizing force $H_c$ can be developed from the familiar property of the triangle; that is, the third side is equal to the square root of the sum of the squares of the other two sides minus twice the product of the sides and the cosine of the included angle. Thus (1) $P_c = H_c^2 = I^2 + n^2 I_e^2 - 2nII_e \cos(a-\theta)$ The opening force or pull $P_o$, operating on the left-hand plunger 17 of the relay, is likewise proportional to the square of its effective ampere-turns, which are $H_0 = rnI_e$. Therefore, assuming identical magnetic circuits so that the factor of proportionality is the same (unity) as for the closing force $P_c$, $$(2) \quad P_0 = H_0^2 = r^2 n^2 I_e^2$$

Since these two pulls, $P_c$ and $P_0$, balance each other mechanically, there is no vectorial relation between the magnetic forces $H_c$ and $H_0$, and these have been shown separately, in Fig. 2. Equating the two pulls $P_c$ and $P_0$, replacing $\cos(a-\theta)$ by $\cos a \cos \theta + \sin a \sin \theta$, and remembering that $I_e$ is proportional to $E$, and hence the ratio of $I_e$ to $I$ is equal (with an appropriate multiplying factor) to the line-impedance $$Z = \sqrt{R^2 + X^2},$$

so that $$\frac{I_e}{I} \cos \theta$$

equals the line-resistance $R$, and $$\frac{I_e}{I} \sin \theta$$

equals the line-reactance $X$, we have $I^2 + n^2 I_e^2 - 2nII_e (\cos a \cos \theta + \sin a \sin \theta) = r^2 n^2 I_e^2$ $$(3) \quad n^2(r^2-1)(R^2+X^2) + 2n(R\cos a + X \sin a) - 1 = 0$$

It is easily seen that Equation (3) represents a circle in which the line-resistance $R$ and the line-reactance $X$ are the coordinates. Dividing through by $n^2(r^2-1)$ and rearranging, we have $$(4) \quad R^2 + \frac{2R \cos a}{n(r^2-1)} + X^2 + \frac{2X \sin a}{n(r^2-1)} = \frac{1}{n^2(r^2-1)},$$

$$(5) \quad \left(R + \frac{\cos a}{n(r^2-1)}\right)^2 + \left(X + \frac{\sin a}{n(r^2-1)}\right)^2 = \frac{r^2}{n^2(r^2-1)^2}.$$

The center of this circle is at $$(6) \quad R_0 = -\frac{\cos a}{n(r^2-1)}$$

$$(7) \quad X_0 = -\frac{\sin a}{n(r^2-1)}$$

and the radius is $$(8) \quad \varrho_0 = \frac{r}{n(r^2-1)}$$

The circle defined in Equations (3) to (8) represents the values of the line-resistance $R$ and the line-reactance $X$ at which the relay is exactly balanced. For any value of these variables, $R$ and $X$, giving a point lying within the circle, the relay will trip. For any point lying without the circle, the relay will not trip.

If the auxiliary voltage-coil 20 is omitted, which means that $n=0$ and $rn=a$ finite value $m$, the relay becomes the instantaneous impedance relay of the aforementioned Goldsborough application, Serial No. 448,937, filed May 1, 1930, said relay balancing at a constant line-impedance which is found from Equation (3) to be $$(9) \quad \sqrt{R^2+X^2} = Z = \pm\frac{1}{rn} = \pm\frac{1}{m}$$

A special case of the relay of my present invention, that is, a composite impedance-reactance relay utilizing the auxiliary voltage-coil 20, is when the two voltage coils 16 and 20 have equal ampere-turns, or $r=1$, and when the angle $a$ is either 180° or 0, that is, when the current in the auxiliary voltage-coil 20 is in phase with $E$ or $-E$. My relay then becomes an instantaneous resistance relay, independent of the line-reactance, and balancing at a constant line-resistance which is found from Equation (3) to be $$(10) \quad R = \frac{1}{2n}$$

for normal current-flow, or $$R = -\frac{1}{2n}$$

for reversed current.

Another special case of my relay is when the two voltage-coils 16 and 20 have equal ampere-turns, or $r=1$ in Fig. 1, and when the angle $a$ is exactly 90°, that is, when the current in the auxiliary voltage-coil 20 lags 90° behind the voltage $(-E)$. As the voltage-coil is highly inductive, this condition would be nearly fulfilled under normal circumstances, and various means may be utilized for making the angle $a$ exactly 90°.

Fig. 3 shows a circuit embodying one such means for obtaining a 90° angle, said means comprising shunting the voltage-coil 20 by a capacitor 24. A suitable adjustment will then have to be made in the ratio of turns $r$ in order to keep the ampere-turns of the auxiliary voltage-coil 20 equal to the ampere-turns of the opposing voltage-coil 16. In the particular circuit shown in Fig. 3, since the closing coil is shunted by a negative reactance, thereby increasing its current, there will have to be more turns in the opening-coil 16 than in the closing-coil 20.

My relay then becomes an instantaneous reactance relay, balancing at a constant line-reactance which may be found from Equation (3), which has reference to the Fig. 1 circuit. Thus, putting $r=1$ and $a=90°$, the balance point is found to be $$(11) \quad X = \frac{1}{2n}$$

for normal current-flow, or $$X = -\frac{1}{2n}$$

for reversed current. I am thus able to provide, for the first time in the history of the relaying art, a truly "instantaneous" or high-speed reactance relay, operating on the balance-beam principle, and attaining a much higher speed than any previous reactance relay.

A reactance relay, such as that just described, would trip for high-power-factor loads, unless prevented from doing so by some auxiliary device which would bring the relay into service only when there is a fault on the line. The impedance relay, on the other hand, provides its own fault-detecting means, requiring only to be backed up, if there is any danger of a reversed current, by a directional relay for locking it out when the current reverses, as pointed out, for example, in the aforementioned Goldsborough application Serial No. 448,937.

In my relay, as shown in Figs. 1 and 2, one may readily vary the number of turns $n$ of the auxiliary voltage-coil 20, or the ratio $r$ or the number of turns in the opposing voltage-coil 16 as compared to the number of turns in the auxiliary closing voltage coil 20, or the angle $a$. Rather than adhere to the conditions of any one of the three special cases already mentioned, I prefer, in most cases, to utilize some condition of operation intermediate between the pure-reactance response and the pure-impedance response, so that a relay may be provided which will have substantially reactance characteristics for faults, or which will be even less affected by fault-resistance than a pure-reactance relay, but which will provide its own fault-detector action, as in the impedance relay. The conditions for permitting this to be done are favorable, on a three-phase line, because there is a very wide gap between the highest fault-impedances and the load-impedance at full load, except on the longest lines, where no difficulty is experienced with impedance relays, anyway, and my present invention is not needed.

To investigate and explain the operation of my relay on a modified reactance principle, it is desirable to plot the resistance-reactance circles of Equations (3) to (8), for several different values of the radius and several different positions of the center.

The maximum value of the line-reactance $X$ for which the relay will balance will be obtained when the radius is parallel to the $X$ axis, in the positive direction. It is $$(12) \quad X_{max} = X_0 + Q_0 = \frac{r - \sin a}{n(r^2 - 1)}.$$

Taking 100% $X_{max}$ as the unit of our coordinate system, we have the coordinates of the center $$(13) \quad R_0 = X_{max} \frac{\cos a}{r - \sin a}$$

$$(14) \quad X_0 = X_{max} \frac{\sin a}{r - \sin a}$$

and the radius $$(15) \quad Q_0 = X_{max} \frac{r}{r - \sin a}.$$

It is evident that the radius of the circle may be varied between zero and infinity, and that the center of the circle may also be located at almost any desired point, by assigning different practical values to the three design-constants $n$, $r$ and $a$.

In Fig. 4, four characteristic circles are plotted, using $X_{max} = 100\%$ as the measuring unit for both $X$ and $R$. While this is convenient in showing the relative influence of reactance and resistance in determining the relay-operation, it must be remembered that the plotted values are in percentages, and that the actual value of $X_{max}$ is different, in each case. The value of $X_{max}$ may be made anything whatsoever, by the proper choice of $n$ or of the ratios of the voltage or current transformers.

The pure-reactance characteristic is shown in curve 31, which is a circle of infinite radius, or a horizontal line corresponding to $X = 100\%$. The center of this circle is at $R_0 = 0$, $X_0 = -\infty$. As pointed out in connection with Figs. 1 and 3, the conditions for this operation are $r = 1$ (in Fig. 1 and in the equations) and $a = 90°$. Thus, in this case, $$X_{max} = \frac{1}{n(r+1)} = \frac{1}{2n},$$

as is evident, also, from Equation (11).

The pure-impedance characteristic is shown in curve 32, which is a circle of radius $Q_0 = X_{max}$, with its center at the origin. As pointed out in connection with Equation (9), the condition for this operation is $n = 0$, $r = \infty$, $rn = m$. The value of $X_{max}$ is $$\frac{1}{rn} = \frac{1}{m}.$$

In considering intermediate characteristic circles in Fig. 4, that is, circles lying between 31 and 32 in the first quadrant, or for positive values of R and X, the precise circle which is the most suitable will depend upon the conditions of operation. It is desirable for the relay to be used without a fault-detecting, initiating device, (other than the usual lock-out device or directional element responsive to reverse-current conditions), and hence the characteristic circle must fall within all points which might represent possible load conditions. It is also desirable, in general, to permit as high a value of resistance as possible, for a given reactance.

A modified reactance characteristic that fulfills the foregoing conditions is shown in curve 33, which is a circle of radius $Q_0 = 3X_{max}$, with its center at $R_0 = .728X_{max}$, $X_0 = -2X_{max}$. One condition for this operation is obtained by dividing Equation (14) by Equation (13), giving $$\tan a = -\frac{2}{.728},$$

or $a = 110°$, as indicated in Fig. 4, which means that the current in the auxiliary voltage-coil 20 leads the current in the current-coil 19 by 70° under unity-power-factor conditions on the line. It necessarily follows, therefore, from Equation (15), that $r = 1.410$, which is the ratio of (the number of turns in the opposing voltage-coil 16 divided by the voltage transformation-ratio applicable thereto) to (the number of turns in the auxiliary voltage-coil 20 divided by the voltage transformation-ratio applicable thereto). The maximum line-reactance for which the relay will respond is found from Equation (12) to be $$X_{max} = \frac{1}{2.1n},$$

of about .48 times the ratio of (the number of turns in the current-coil 19 divided by the current transformation-ratio applicable thereto) to (the number of turns of the auxiliary voltage-coil 20 divided by the voltage transformation-ratio applicable thereto). It will be observed that the ratio, $r = 1.41$ is a reasonable ratio for the voltage-coil turns.

The 110° angle $a$ may be obtained (1) with a network as shown in Fig. 3, using a main or opposing voltage-coil 16 having a higher ratio of resistance-to-inductance than the auxiliary voltage-coil 20; or (2) by using the expedient shown in Fig. 5, comprising two auxiliary voltage-coils 20a and 20b in place of the coil 20, one of them (as 20b) being connected in the opposing direction, with a capacitor 28 in series with it; or (3) by using a transient shunt across the current-coil 19, which causes the current to advance in phase about 30°, so that an ordinary voltage-coil circuit having an 80° lagging impedance (with respect to $-E$) may be utilized, as in the system of connections which will be described in connection with Figs. 6 and 7; or (4) by using shunt-connected voltage-coils 16 and 20, instead of the series connection, and inserting a capacitor in series with the auxiliary voltage-coil 20, so as to cause the current in said coil to lead the voltage ($+E$) by 70°, as in the system of connections which will be described in connection with Figs. 8 and 9.

Referring to the modified-reactance curve 33 in Fig. 4, it will be noted that the third and fourth quadrants, corresponding to reverse-current operation, or operation with the line-current flowing toward the relay from the line, may be cut off by a fast directional element, which has already been developed as a part of the high-speed impedance relay. The region in the second quadrant will generally cause no trouble, because faults on the phase being protected will not give points in this quadrant, and the impedance for points within the circle in this quadrant is so small that it can hardly be obtained for faults on other phases or for load conditions.

I utilize, therefore, the first-quadrant conditions depicted in Fig. 4, when the auxiliary voltage coil 20 opposes the current coil 21 for conditions when the relay should trip, that is, when the line current is flowing out on the line away from the relay. With the auxiliary voltage coil opposing the current coil, the relay requires a larger current in order to trip, which is indicated in Fig. 4 by the smaller impedances of the first quadrant as compared to the third and fourth quadrants.

With this characteristic, the permissible apparent fault-resistance, added to the line resistance, may reach large values without preventing tripping under fault conditions. For example, if the balance-point is set at 90% $X_{max}$, the apparent resistance may reach 147% of $X_{max}$; and if the balance-point is set at 50% $X_{max}$, a value of resistance of nearly 240% $X_{max}$ may be tolerated, etc. By this means, I can compensate for the resistance that is already in the line itself, and provide a relay which is substantially independent of the resistance of the arc over any desired range of values.

Other center-locations and radii of the characteristic circle of my modified impedance-reactance relay may be taken to suit the conditions of operation of any particular line. For example, the impedance-relay characteristic of curve 32 in Fig. 4 will be considerably improved if, keeping the same diameter, the center of the characteristic circle is moved to the right along the resistance axis in Fig. 4, to a point such as $R_0 = 25\%$ $X_{max}$. This circle, marked "Modified Impedance Relay Characteristic", is shown at 34 in Fig. 4. Since the line-conductors must have some resistance, no fault will occur in which some resistance is not present in the apparent impedance measured by the relay. Advantage is taken of this to add the approximate amount of this resistance to the permissible fault resistance of the impedance-relay characteristic, thus allowing the fault resistance to become appreciably larger without preventing tripping.

To calculate the conditions for the modified impedance-relay curve 34 in Fig. 4, we put $R_0 = .25$ $X_{max}$ and $X_0 = 0$, in Equations (13) and (14), giving $$\frac{\cos a}{r - \sin a} = -.25$$

and $$\frac{\sin a}{r - \sin a} = 0$$

Putting $\sin a = 0$, we have, as the necessary conditions, $a = 180°$, which means that the current in the auxiliary voltage-coil 20 of Fig. 1 is in phase with the line-voltage E, and $r = 4$, which means that the main voltage-coil 16 of Fig. 1 has four times as many turns as the auxiliary voltage coil 20. The phase-coincidence expressed by $a = 180°$ may easily be obtained by using a series capacitor (not shown in Fig. 1) and by reversing the voltage connections.

Figure 6 shows a general view of a relay which embodies the composite-impedance reactance principle as discussed previously. This relay is illustrated as embodying a first distance element 40 and a second distance element 41, both elements being instantaneous in their action. The first element is designed to trip at a balance point at about 80% of the length of the line section being protected. The second element is designed to trip at about 150% of the length of the line section, or, in other words, somewhere around the middle of the next succeeding line section.

The relay is provided with ten terminal binding posts numbered 1 to 10 to which the external connections, designated by dotted lines, are applied. The battery for the trip coils of the circuit breakers and the trip coils themselves are connected between the binding posts 9 and 7. Inside the relay, these two binding posts are connected to the normally open contacts 13, 14 of the first distance element 40, in series with the normally open contacts 44 of an instantaneous directional element 45, which may be of the type which is described in the above-mentioned application on the high-speed impedance relay. The circuit for the tripping coil also includes the solenoid 46 of a contactor 47, which picks up and relieves the delicate contacts 13, 14 and 44 of the heavy current duty, by-passing them through a circuit 48. The trip-coil circuit also includes an indicator 49. The contactor switch 47, also has a contact which is connected, at 50, to the terminal binding post 10 of the relay, to which any desired external indicating or controlling device may be connected.

The current coils 19 of the two distance elements are connected together between the terminal binding posts 1 and 2. The main voltage coils of the distance elements are each split into two dephased sections 16a and 16b which are connected in shunt to each other, with a resistance 52 in series with the section 16a and a reactance 53 in series with the section 16b, said dephased voltage coils being described and claimed in an application of Leslie N. Crichton and Herbert C. Graves, for Impedance elements for protective relay systems, Serial No. 692,472, filed October 6, 1933, and assigned to the Westinghouse Electric & Manufacturing Company, said application being a division of a parent-application Serial No. 437,924, filed March 20, 1930 for Protective relay systems, which parent-application was a substitute for, and a continuation-in-part of, an application Serial No. 393,433, filed September 18, 1929. The auxiliary voltage coils 20 of the distance elements are also connected in shunt, with a reactance 54 in series therewith. The voltage coils of the distance elements are connected to the terminals 5 and 8 of the relay.

The distance elements are shown here as being alike, except for the settings of the balance points. These elements are quite simple, mechanically, consisting merely of a pivoted steel beam 11a, opposite sides of which are acted upon by different electromagnets. The magnetizable cores upon which the sub-divided voltage coils 16a and 16b are mounted are usually disposed transversely with respect to the steel beam 11a, but for convenience in illustration, they have been illustrated as being displaced longitudinally along the beam. The object in using the two sub-divided voltage coils 16a and 16b, with separate magnetic circuits, and with their fluxes out of phase with one another, is to prevent chattering and to prevent the tripping of the beam during the period when the voltage is going through zero. This is necessary because of the extremely fast action of the relay element.

In my mathematical analysis of the fundamental principle of my new relay, I treated the main coil 16 as a single coil. If this coil is subdivided, it in no way affects the fundamental principle, since the only requirement is that the effective pull of the main voltage coil 16 shall be proportional to the square of the voltage, and a divided magnetic circuit may be used just as effectively as an undivided circuit, to get this response proportional to the square of the voltage. When I refer to a main voltage coil 16, therefore, I contemplate either a single or sub-divided coil.

The directional element 45 has a current coil 55 which is connected across the terminals 2 and 4, and a voltage coil 56 which is connected across the terminals 3 and 6. In series with the current coil 55 is the primary winding of a current transformer 57, the secondary winding of which is permanently connected to the terminals of a constant-speed synchronous timing motor 58 which closes contacts 59 after a time interval of 15 cycles, more or less, sufficient to permit the circuit breakers to clear the fault if the first distance element 40 picks up. The timer contacts 59 are connected, in parallel, to the contacts 13, 14, 44, across the terminals 7 and 9.

The terminals of the timing motor are normally short-circuited both by the normally closed contacts 61 of the second distance element and by some normally closed contacts 62 on the directional element 45, so that the timing motor is not started in operation until the second distance element operates, and then only, provided that the current is flowing out into the line to which the relay is connected.

The current for the current-responsive coils of the entire relay assembly is supplied to the terminals 1 and 4, the distance element coils 19 being connected in series with the directional element and timer coils 55 and 58.

In the particular embodiment of my invention shown in Fig. 6, a transient shunt 64 is connected across the distance element coils 19, that is, between the terminals 1 and 2, for the purpose of preventing faulty operation due to the transient which practically disappears within a time of the order of 1 cycle after the insipience of the fault. When the distance elements are extremely rapid in their operation, this transient shunt is needed in order to avoid errors in the apparent impedance to which the relay responds. This transient shunt consists of a large resistance 65 in series with the current coils 19, the resistance and coils being shunted by an impedance 66 having a phase angle corresponding to the phase angle on the line, as described and claimed in the aforesaid Patent No. 1,924,307 of L. N. Crichton. As pointed out hereinabove, the effect of the transient shunt is to advance the phase of the current in the current coils 19 by something like 30°.

Figure 7 shows six of my relays, such as are shown in Fig. 6, connected in an actual 3-phase transmission system to obtain full protection against both ground and line faults. The apparatus which has been described in connection with Fig. 6 is indicated, in Fig. 7, by a rectangle having the ten terminal binding posts 1 to 10, and the complete system of external connections is indicated. The three ground relays have their current and voltage windings of the distance elements energized in accordance with the line currents and the line-to-neutral voltages, whereas the three line relays have the current and voltage coils of the distance elements energized in accordance with the difference between two line currents and the line-to-line voltages, respectively.

Referring to Fig. 7, I have shown a 3-phase transmission line 70 which is to be protected. It is provided with a circuit breaker 71 having a trip coil 72 which is adapted to be energized from a battery 73. The relay currents are provided by three star-connected current transformers 74, the terminals of which are connected to the terminals 4 of the three ground relays, respectively. The other current terminals 1 of the three ground relays are connected, respectively, to the terminals 4 of the three line relays. The terminals 1 of the ground relays are also shunted by a zero-phase-sequence filter 75 which has the property of permitting the substantially unimpeded flow of zero-phase-sequence currents while substantially preventing any flow of positive or negative phase-sequence currents, as described in my patent on that subject No. 1,877,139, patented September 13, 1932. The neutral point of the zero-phase sequence filter 75 is connected back to the neutral point of the current transformers 74 so as to provide a return path for the zero-phase-sequence components of the line currents in the current coils of the ground relays. The second current-coil terminals 1 of the three line relays are each connected to the terminal 1 of the ground relay in the next succeeding phase, so that the current coils of the line relays are energized in proportion to the line current in the first phase minus the line current in the second phase.

Relay voltages for operating the relays are obtained from a star-star potential transformer 80, the various voltage connections being obvious from the circuit-diagram in Fig. 7.

Fine adjustment of the balance point is assumed to be made by means of taps on the current coils 74, and coarse adjustment is assumed to be made by means of an external reactor 82 which is connected in series with the voltage coils of the distance elements in each of the six relays.

It will be noted that the relay shown in Fig. 6 utilizes a modified impedance characteristic for both of the distance elements of the relay, the relay characteristic being of the order of that shown at 33 in Fig. 4. It will be noted that this relay also utilizes a transient shunt, which advances the current phase by 30°, so that the current in the auxiliary voltage coil 20 may lag 110°−30°=80° behind the voltage (−E). As pointed out in my introductory remarks, the modified impedance characteristic is not needed, in general, in the first distance element, and when a third distance element is utilized, as is common, the modified impedance characteristic is not needed there, either. Quite often, also, it is not necessary to go to the refinement of utilizing a transient shunt, and it is desirable to avoid this shunt, if possible, not only on account of its initial expense, but also on account of the additional load which it imposes on the current transformers.

I have accordingly shown, in Fig. 9, what is now my preferred form of embodiment of a modified impedance relay, which is applicable in most cases where such a relay is required, on short transmission lines. In this relay, the second distance element, which has the modified characteristic, obtains the desired 110° lag behind the voltage (—E), or 70° lead ahead of the voltage E, by means of a serially-connected capacitor 30 as previously described with reference to Fig. 8.

The relay shown in Fig. 9 also differs from that shown in Fig. 6 in having a first distance element and a third distance element, both of which operate on the pure-impedance characteristic, such as that shown at 32 in Fig. 4, the second distance element operating on a modified-reactance characteristic, such as shown at 33 in Fig. 4, as just described. The dephasing of the fluxes in the two sub-divided main voltage coils 16a and 16b is also somewhat different from that shown in Fig. 6, the difference being that a capacitor 90 is connected in series with the subdivided coil 16b. The main voltage coils of the second and third impedance elements are connected in series, because of the more remote balance points at which these relays are designed to operate.

The timing element 92 in Fig. 9 is provided with a set of first contacts 93 which are closed first and a set of second contacts 94 which are closed at a later time.

The operation of the various elements can be seen from an inspection of Fig. 9. Assuming a fault to occur in the instantaneous zone (up to 80% of the line-section), all three distance elements will operate simultaneously. Since the directional contacts 44 are closed and since the first-element contacts 13, 14 are also closed, the circuit breaker is tripped before the timing element 92 moves appreciably.

If the fault should occur in the intermediate zone, however, the first distance element cannot operate, because the voltage-restraint is too great, but the intermediate (second) and back-up (third) elements are free to operate. Operation of the back-up element opens a pair of normally closed relay-contacts 95 and closes a pair of normally open relay-contacts 96. The opening of the contacts 95 removes a short-circuit on the timing motor 92 and allows it to start. After a definite time-interval, the timer closes the intermediate contacts 93, from which a tripping circuit is completed through the closed contacts 97 of the second impedance element and the closed contacts 44 of the directional element.

If the fault should be still further away, in the back-up zone, and if it is not cleared at some other point, only the third distance element will pick up. When the synchronous timer 92 reaches the intermediate contacts 93, it will not trip the circuit breaker because the contact 97 on the intermediate distance element is open. The timer, therefore, continues its travel until it reaches the back-up contacts 94, at which time a tripping circuit will be closed through the third-element contacts 96 and the directional-element contacts 44, provided that the current is flowing out into the line from the relaying point. After the fault is cleared, all elements reset almost instantly.

The external connections of the relay shown in Fig. 9 may be those shown in Fig. 7, omitting the transient shunts 64, or any equivalent connections may be used. For obtaining the difference between two line currents, which is necessary for use in the line relays, and at the same time obtaining the line current which is preferable for use in the current coils of the directional element and timing element of said line relays, I prefer to use the connections indicated diagrammatically in Fig. 10.

In Fig. 10, the current from the star-connected current-transformers 100 is led directly through the respective directional-element and timer-element circuits 101 of the three line relays, returning to the star point of the current-transformers. The difference between two line currents is formed with the aid of three auxiliary adjusting transformers 102 having their primary windings 103 connected in series with the respective current-transformers 100, and having their secondary windings 104 connected in delta and energizing the three distance-element coils 105 which are connected in star, so that each coil 105 is traversed by the difference of two line currents supplied by the secondary windings 104 of the auxiliary transformers 102.

My new modified impedance relay is intended for application on the shorter line-sections met with in practice, where the arc resistance reaches a value comparable to the line impedance. The factor which limits the maximum length of line to which this modified relay can be supplied is the possibility of the modified impedance-reactance element tripping on load currents. The longer the line the greater is this possibility. For the particular characteristic shown at 33 in Fig. 4, this limit is approximately two secondary ohms, by which I mean the ohms of the transmission line up to the balance point of the relay, divided by the voltage-transformer ratio, and multiplied by the current-transformer ratio. For other characteristics intermediate between pure-impedance response and pure-reactance response, other limits may be obtained for the maximum length of line-section to which the relay may be applied, without additional safeguards other than the directional element.

The principle employed in my relay is particularly valuable in that it imparts a wide flexibility to the distance-measuring characteristics. It can be applied to any or all of the three distance elements, and it allows the relay to operate on any sort of characteristic which experience may indicate is desirable.

The subject-matter of this patent-application is also discussed and illustrated at more or less length in a paper which I am presenting before the American Institute of Electrical Engineers on January 25, 1932.

The diagram of external relay connections shown in Fig. 7 utilizes a form of connection of the three ground relays which has been used previously in conjunction with reactance relays. An improved connection for the ground relays which provides a more accurate means of measuring the distance to the fault in terms of the reactance and resistance of the line has been made the subject of my Patent No. 1,897,022, granted February 7, 1933, and described in a paper entitled "Fundamental basis for distance relaying on three phase systems" presented before the American Institute of Electrical Engineers March 12, 1931.

I claim as my invention:

1. A protective system for an alternating-current transmission line, comprising a modified impedance relay comprising a current-coil for actuating the relay, a main voltage-coil for restraining the relay, structural means for opposing the magnetic pulls developed by said coils, and an auxiliary voltage-coil opposing the magnetic pull of the current coil for the direction of current when it is flowing out on the line away from the relay, said auxiliary voltage-coil operating on the same magnetic circuit as the current-coil.

2. A protective system for an alternating-current transmission line, comprising a modified impedance relay comprising a current-coil, a main voltage-coil, structural means for opposing the magnetic pulls developed by said coils, an auxiliary voltage-coil opposing the magnetic pull of the current coil for the direction of current when it is flowing out on the line away from the relay, said auxiliary voltage-coil operating on the same magnetic circuit as the current-coil, and means for so energizing the various coils as to obtain a modified impedance-reactance characteristic circle of reactance to resistance, at the balance point, expressed in terms of the maximum reactance, intermediate between the pure-reactance characteristic and the pure-impedance characteristic.

3. A modified impedance relay comprising a current-coil for actuating the relay, a main voltage-coil for restraining the relay, structural means for opposing the magnetic pulls developed by said coils, an auxiliary voltage-coil opposing the magnetic pull of the current coil for the direction of current when it is flowing out on the line away from the relay, said auxiliary voltage-coil operating on the same magnetic circuit as the current-coil, and means for causing the current in the auxiliary voltage-coil to lead the corresponding impressed line-voltage by an angle something like 70°.

4. A modified impedance relay comprising a current-coil, a main voltage-coil, structural means for opposing the magnetic pulls developed by said coils, an auxiliary voltage-coil modifying the magnetic pull of the current coil and operating on the same magnetic circuit as the current-coil, and means for causing the current in the auxiliary voltage-coil to lead the corresponding impressed line-voltage by an angle something like 70°, the ratio of (the number of turns in the main voltage-coil divided by the voltage transformation-ratio applicable thereto) to (the number of turns in the auxiliary voltage-coil divided by the voltage transformation-ratio applicable thereto) being something like 1 or 2.

5. A modified impedance relay comprising a current-coil, a main voltage-coil, structural means for opposing the magnetic pulls developed by said coils, an auxiliary voltage-coil modifying the magnetic pull of the current coil and operating on the same magnetic circuit as the current-coil, and means for causing the current in the auxiliary voltage-coil to lead the corresponding impressed line voltage by such an angle and the ratio of turns of the two voltage-coils being such that the abscissa of the center of the circle expressing the relation of reactance to resistance, at the balance point, expressed in terms of the maximum reactance, is of the order of $\frac{1}{4}$ to 1 times the said maximum reactance, and the intercept of said circle on the X-axis is at a resistance of the order of $2\frac{1}{2}$ to 3 times the said maximum reactance.

6. A protective system for an alternating-current transmission line, comprising a modified impedance relay comprising a current-coil for actuating the relay, a main voltage-coil for restraining the relay, structural means for opposing the magnetic pulls developed by said coils, an auxiliary voltage-coil opposing the magnetic pull of the current-coil for the direction of current when it is flowing out on the line away from the relay, said auxiliary voltage-coil operating on the same magnetic circuit as the current-coil, and means for causing the current in the auxiliary voltage-coil to be substantially in phase with the corresponding impressed line-voltage.

7. A modified impedance relay comprising a current-coil, a main voltage-coil, structural means for opposing the magnetic pulls developed by said coils, an auxiliary voltage-coil modifying the magnetic pull of the current-coil and operating on the same magnetic circuit as the current-coil, and means for causing the current in the auxiliary voltage-coil to be substantially in phase with the corresponding impressed line-voltage, the ratio of (the number of turns in the main voltage-coil divided by the voltage transformation-ratio applicable thereto) to (the number of turns in the auxiliary voltage-coil divided by the voltage transformation-ratio applicable thereto) being of the order of 1 to 4.

8. A modified impedance relay comprising a current-coil, a main voltage-coil, structural means for opposing the magnetic pulls developed by said coils, an auxiliary voltage-coil modifying the magnetic pull of the current-coil and operating on the same magnetic circuit as the current-coil, and means for causing the current in the auxiliary voltage-coil to lead the corresponding impressed line-voltage by an angle of approximately 90°, the ampere-turns in the two voltage-coils being approximately equal.

9. A modified impedance relay comprising a current-coil, a main voltage-coil, structural means for opposing the magnetic pulls developed by said coils, an auxiliary voltage-coil modifying the magnetic pull of the current-coil and operating on the same magnetic circuit as the current-coil, and a capacitor in series with said auxiliary voltage-coil.

10. A modified instantaneous impedance relay comprising a current-responsive actuating coil, a main voltage-responsive restraining-coil means for providing subdivided dephased groups with separate magnetic flux paths, structural means for opposing the magnetic pulls developed by said coils, and an auxiliary voltage-coil opposing the magnetic pull of the current-coil for the direction of current when it is flowing out on the line away from the relay, said auxiliary voltage-coil operating on the same magnetic circuit as the current-coil.

11. A modified impedance relay comprising a current-coil, a main voltage-coil, structural means for opposing the magnetic pulls developed by said coils, an auxiliary voltage-coil modifying the magnetic pull of the current-coil and operating on the same magnetic circuit as the current-coil, and a more quickly acting directional element for rendering the actuation of the modified impedance relay ineffectual unless the line-current is flowing in a predetermined direction.

12. A plural-zone distance relay comprising an instantaneous impedance element for the first zone, a timer element, a modified impedance-reactance element for another zone, means for causing the impedance element to interrupt its line-section, if faulty, quickly, means for causing the modified impedance-reactance element to interrupt said line-section, if a more distant fault occurs, through said timer element after a time-delay, and an instantaneous directional element for rendering the actuation of said impedance element and said modified impedance-reactance element ineffectual unless the line-current is flowing in a predetermined direction.

13. A three-zone distance relay comprising first, second and third quick-acting distance elements, the first and third being impedance elements and the second being a modified impedance-reactance element, an instantaneous directional element associated with all three distance elements, a timer means associated with the second and third distance elements, means for connecting said three quick-acting distance elements so as to respond to conditions in a power circuit, and protective means responsive to the first distance element and the timer means.

14. A modified reactance relay element comprising means for balancing a current-responsive torque-producing actuating element against a restraining element which is at least partially responsive to voltage, said modification comprising an auxiliary voltage-coil operating on said current-responsive torque-producing element and opposing said current-responsive torque for the direction of current when it is flowing out on the line away from the relay.

15. The combination, with a star-connected group of current transformers for a three-phase line, of three current-coils adapted to be connected so as to be traversed by currents proportional to the line currents of the different phases, respectively, means for energizing said current-coils in star-connection from said current transformers, with the star-point of the current-coils connected to the star-point of the current transformers, three auxiliary current transformers having primary windings connected in the three current-transformer phases, respectively, and having delta-connected secondary windings, three other current-coils adapted to be connected so as to be traversed by currents proportional to the difference between two line-currents, respectively, and means for energizing said three last-mentioned current-coils in star-connection from said delta-connected secondary windings.

16. The combination, with a star-connected group of current transformers for a three-phase line, of three current-coils adapted to be connected so as to be traversed by currents proportional to the line currents of the different phases, respectively, means for energizing said current-coils in star-connection from said current transformers, with the star-point of the current-coils connected to the star-point of the current transformers, three auxiliary current transformers having primary windings connected in the three current-transformer phases, respectively, and having delta-connected secondary windings, three other current-coils adapted to be connected so as to be traversed by currents proportional to the difference between two line-currents, respectively, and means for energizing said three last-mentioned current-coils in star-connection from said delta-connected secondary windings, characterized by said auxiliary transformers having adjustable ratios whereby the transformation-ratio applicable to said three last-mentioned current-coils may be adjusted.

WILLIAM A. LEWIS.